(12) United States Patent
Hueger et al.

(10) Patent No.: US 8,521,364 B2
(45) Date of Patent: Aug. 27, 2013

(54) METHOD AND DEVICE FOR ASSISTED PARKING OF A MOTOR VEHICLE

(75) Inventors: Philipp Hueger, Wolfsburg (DE); Ulrich Wuttke, Braunschweig (DE); Kai Koenig, Frankfurt am Main (DE)

(73) Assignee: Volkswagen AG, Wolfsburg (DE)

( * ) Notice: Subject to any disclaimer, the term of this patent is extended or adjusted under 35 U.S.C. 154(b) by 477 days.

(21) Appl. No.: 12/779,189

(22) Filed: May 13, 2010

(65) Prior Publication Data

US 2011/0004375 A1 Jan. 6, 2011

(30) Foreign Application Priority Data

May 19, 2009 (DE) .......................... 10 2009 022 010
Jun. 23, 2009 (DE) .......................... 10 2009 030 241
Apr. 22, 2010 (DE) .......................... 10 2010 018 158

(51) Int. Cl.
*A01B 69/00* (2006.01)

(52) U.S. Cl.
USPC ............................................. 701/41; 701/36

(58) Field of Classification Search
USPC .................................. 701/36, 40–44
See application file for complete search history.

(56) References Cited

U.S. PATENT DOCUMENTS

| 5,864,285 | A | 1/1999 | Wieder et al. ................. 340/435 |
| 6,906,640 | B2 | 6/2005 | Gotzig et al. ............. 340/932.2 |
| 7,825,828 | B2 * | 11/2010 | Watanabe et al. .......... 340/932.2 |
| 2004/0267420 | A1 * | 12/2004 | Tanaka et al. ................... 701/36 |
| 2005/0060073 | A1 * | 3/2005 | Tanaka et al. ................... 701/36 |
| 2005/0270177 | A1 * | 12/2005 | Mori et al. ................. 340/932.2 |
| 2007/0288145 | A1 * | 12/2007 | Maeda et al. ................... 701/41 |
| 2009/0259365 | A1 * | 10/2009 | Rohlfs et al. ................... 701/41 |
| 2010/0070138 | A1 * | 3/2010 | Schoening et al. ............ 701/42 |
| 2010/0259420 | A1 * | 10/2010 | Von Reyher et al. ...... 340/932.2 |
| 2010/0286872 | A1 * | 11/2010 | Endo et al. ...................... 701/41 |
| 2011/0120797 | A1 * | 5/2011 | Kitahata et al. ............... 180/443 |
| 2011/0304477 | A1 * | 12/2011 | Yoshihashi et al. ........ 340/932.2 |
| 2012/0133767 | A1 * | 5/2012 | Muramatsu et al. .......... 348/148 |

FOREIGN PATENT DOCUMENTS

| DE | 122426 | 10/1900 |
| DE | 19607788 | 9/1997 |
| DE | 10220426 | 11/2003 |
| DE | 102004054437 | 5/2006 |
| DE | 102005008176 | 8/2006 |
| DE | 102006035929 | 2/2008 |
| DE | 102008006054 | 7/2009 |

OTHER PUBLICATIONS

German Search Report for Application No. 10 2009 030 241.7 (2 pages), Jan. 26, 2010.

* cited by examiner

*Primary Examiner* — Hussein A. Elchanti
(74) *Attorney, Agent, or Firm* — King & Spalding L.L.P.

(57) ABSTRACT

In a method and a device for assisted parking of a motor vehicle into a parking space or assisted pulling out of a motor vehicle from a parking space, a predetermined maximum speed is given for each parking phase of the single step or multiple step parking or pulling out action consisting of several parking phases, wherein when exceeding the predetermined speed during a parking phase a limitation of the speed of the motor vehicle to the maximum speed allowed for the parking phase is carried out.

14 Claims, 3 Drawing Sheets

METHOD AND DEVICE FOR ASSISTED PARKING OF A MOTOR VEHICLE

CROSS-REFERENCE TO RELATED APPLICATIONS

This application claims priority to DE Patent Application No. 10 2009 022 010.0 filed May 19, 2009, DE Patent Application No. 10 2009 030 241.7 filed Jun. 23, 2009, and DE Patent Application No. 10 2010 018 158.7 filed Apr. 22, 2010, the contents of which is incorporated herein by reference in its entirety.

TECHNICAL FIELD

The invention relates to a method for assisted parking of a motor vehicle according to the preamble of claim 1 and to a respective device according to the preamble of claim 8.

BACKGROUND

Devices for assisted parking of a motor vehicle are increasingly used in today's motor vehicles. As an example of such driver assistance systems the park steering assistant of Volkswagen is to be mentioned, where a periphery sensor system measures an appropriate parking space during passing by and the vehicle due to a driver command parks into the parking space based on an appropriate starting point by means of the park steering assistant, wherein the park steering assistant autonomously takes over the steering activity while the driver is responsible for the speed of the vehicle. This requires a controllable electro-mechanic steering gear in order to be able to apply the required steering momentum to the steering gear by means of an appropriate actuator. It is a disadvantage of the well-known driver assistance system that when exceeding a predetermined maximum speed of 10 km/h by a predetermined amount, for example 20%, the assistance function is deactivated and the driver all of a sudden does not anymore receive a steering assistance.

Furthermore, known from DE 196 07 788 A1 is a method and a device for controlling the approach of a vehicle towards an obstacle, where the speed of the vehicle is limited by means of controlling the power of the drive unit of the vehicle in a first range of a distance to the obstacle, and in a second distance range braking power is established at the wheel brakes of the vehicle. It is a disadvantage of the method known from the art that no active steering assistance is provided to the driver.

Furthermore, known from DE 122 426 A1 is a method for operating a parking assistance system and such a parking assistance system in which an automatic braking and/or accelerating of the vehicle is carried out during the activity of parking and/or pulling out. Also here it is a disadvantage that an active steering assistance of the driver is not provided for.

SUMMARY

According to various embodiments, a method and a device for assisted parking of a motor vehicle can be established which omit the mentioned disadvantages of the systems known in the art, in particular the deactivation of the assistance function when exceeding the maximum speed.

According to an embodiment, in a method for assisted parking of a motor vehicle in a parking space or assisted pulling out of a motor vehicle from a parking space, for each parking phase of the single step or multiple step parking or pulling out activity consisting of several parking phases a predetermined maximum speed is predetermined, and when exceeding the predetermined speed during a parking phase a limitation of the speed of the motor vehicle is carried out to the maximum speed allowed for the parking phase.

According to a further embodiment, the limitation of the speed to the maximum speed allowed for the parking phase can be carried out by actively slowing down the motor vehicle. According to a further embodiment, the active slowing down can be carried out by means of the braking system of the motor vehicle and/or by means of throttling of the engine output. According to a further embodiment, in a single step parking or pulling out activity the parking phases can be differentiated between parking phases comprising active straight steering intervention and parking phases comprising active turning steering intervention. According to a further embodiment, in a multiple step parking or pulling out activity the parking phases can be differentiated between parking phases comprising active straight steering intervention in forward or backward direction and in parking phases comprising active turning steering intervention in forward or backward direction. According to a further embodiment, parking phases comprising active straight steering intervention can be limited by a maximum speed of 10 km/h and parking phases comprising active turning steering intervention are limited by a maximum speed of 7 km/h. According to a further embodiment, the active slowing down can be carried out in a jerky manner or comfortably controlled.

According to an embodiment, a device for conducting assisted parking of a motor vehicle in a parking space or assisted pulling out of a motor vehicle from a parking space may comprise a periphery sensor system for measuring current periphery data, a parking space determination unit for determining a parking space during the passing by, a trajectory unit for calculating a parking or pulling out trajectory, an assistance unit for assisting the driver during a parking or pulling out activity, a steering interface for controlling a controllable steering unit for conducting an active steering intervention, a comparison unit for comparing the current speed to predetermined maximum speeds of individual parking phases, and a limiting unit for carrying out an active slowing down of the motor vehicle on the basis of the comparison result of the comparison unit for limiting the speed of the motor vehicle.

According to a further embodiment of the device, the limiting unit may have an interface for controlling a controllable brake unit and/or an interface for regulating the engine output for active slowing down of the motor vehicle. According to a further embodiment of the device, the device may have a display unit for informing the driver about the assisted parking or pulling out activity. According to a further embodiment, the device may be operable to perform the method as described above.

BRIEF DESCRIPTION OF THE DRAWINGS

Embodiments are described in the following with the help of the drawings, where.

DETAILED DESCRIPTION

Figure 1:
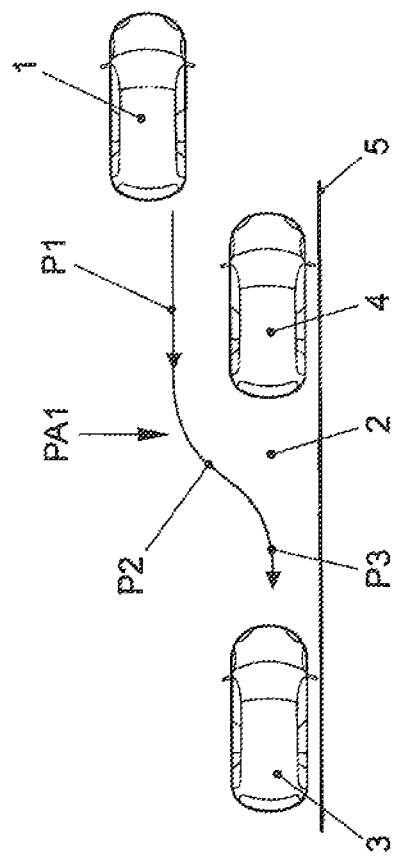
FIG. 1 shows a single step parking into a longitudinal parking space.

In the method according to various embodiments for assisted parking of a motor vehicle in a parking space or for assisted pulling out of a motor vehicle from a parking space a predetermined maximum speed is given for each parking phase of the single step or multiple step parking or pulling out action consisting of several parking phases, wherein when exceeding the predetermined maximum speed during a parking phase a limitation of the speed of the motor vehicle to the allowed maximum speed for the respective parking phase is carried out.

Preferably, the limitation of the speed to the allowed maximum speed for the parking phase may be carried out by means of actively slowing down the motor vehicle. In other words, actively slowing down is to mean the application of an appropriate braking deceleration to the motor vehicle in order to maintain the allowed maximum speed of the respective parking phase. In particular, actively slowing down the motor vehicle may be carried out by means of the braking system of the motor vehicle and/or by means of throttling the engine output.

In doing so, the parking or pulling out activity, respectively, may be a single or multiple step activity. In that a maximum speed is predetermined for each parking phase, the compliance of which is assured by slowing down the vehicle, a deactivation of the assistance function "assisted parking" is positively avoided and the desired assistance function is provided to the driver during the complete parking activity. In particular, in this way situations are avoided in which the driver causes a collision because of carelessness at excessive speed due to the deactivation of the assistance function.

In a single step parking or pulling out activity the parking phases preferably may be differentiated between parking phases comprising active straight steering intervention and parking phases comprising active turning steering intervention. In other words, the parking activity is for example composed of stringing together a first parking phase comprising a straight steering intervention, a subsequent second parking phase comprising an active turning steering intervention and a third parking phase comprising a straight steering intervention. This parking activity corresponds to a typical single step backward parking in the case of a sufficiently large parking space.

In the case of a multiple step parking activity or pulling out activity, respectively, the parking phases are differentiated between parking phases comprising active straight steering intervention and in parking phases comprising active turning steering intervention in forward or backward direction, respectively. The differentiation of the parking activity between several parking phases in forward and backward direction comprising straight or turning steering intervention during multiple step parking also are a typical parking or pulling out behaviour, respectively.

Independent of the direction, parking phases comprising active straight steering intervention preferably may be limited by a maximum speed of 10 km/h and parking phases comprising active turning steering intervention by a maximum speed of 7 km/h. However, it is also conceivable to define different maximum speeds for parking phases in forward direction and for those in backward direction. Of course, maximum speeds other than the above mentioned are feasible.

Further, the active slowing down may be carried out in a jerky manner in order to signalize the speeding to the driver, or it may be carried out with an emphasis on comfort by means of a controlled braking intervention. In doing so, the active slowing down may be carried out by means of the braking system and/or by means of a throttling of the engine output.

A device according to various embodiments for executing the previously described method for assisted parking of a motor vehicle in a parking space or for assisted pulling out of a motor vehicle from a parking space comprises:
  a periphery sensor system for measuring current periphery data of the motor vehicle,
  a parking space determination unit for determining a parking space during passing by of the motor vehicle,
  a trajectory unit for calculating a parking trajectory or a pulling out trajectory, respectively,
  an assistance unit for assisting the driver during the parking or pulling out activity, respectively,
  a controllable steering unit for executing an active steering intervention,
  a comparison unit for comparing the actual speed of the motor vehicle with predetermined maximum speeds of the individual parking phases, and
  a limiting unit for executing an active slowing down of the motor vehicle on the basis of the comparison result of the comparison unit for limiting the speed of the motor vehicle.

Preferably, the limiting unit for actively slowing down the motor vehicle may have an interface for controlling a controllable brake unit and/or an interface for regulating the engine output. Thereby, on the one hand the active slowing down may be carried out by means of an execution of a braking activity by means of the braking system or by means of a throttling of the engine output by means of the driver assistance system or by means of a respective combination of both measures without driver intervention.

In doing so, the device according to various embodiments preferably may comprise an interface to required data present in the vehicle, such as the current speed of the vehicle.

Furthermore, the device according to various embodiments may have an interface for regulating the engine output of the motor vehicle, so that the active braking intervention may also be applied via lowering the engine output. This lowering of the engine output may be sufficient in respective basic conditions in order to not exceed the maximum speeds. Further, such an interface also is reasonable in order to avoid an unintended acceleration of the vehicle, for example, which would have to be compensated for via a correspondingly larger braking power of the braking system. The interface may also form an interface to the drive train coordinator which specifies the acceleration parameters for the engine control.

Preferably, the assistance device may have a display unit for informing the driver about the assisted parking activity or pulling out activity, respectively.

In particular, the controllable steering unit may be a controllable electro-mechanic steering gear.

FIG. 1 shows the typical single step rearward parking of a vehicle 1 into a sufficiently large longitudinal parking space 2 which is formed by the parked vehicles 3 and 4 plus the curb 5. In doing so, the parking activity into PA1 is carried out in several phases P1, P2 and P3, as is described in the following:

At first the passing by of vehicle 1 along parking space 2 is carried out. During this passing by the parking space 2 is measured and it is determined if it is appropriate for the vehicle 1.

If parking space 2 is appropriate, the driver stops the vehicle 1 at an appropriate starting point and the driver is prompted by the assistance system to engage the reversing gear.

After engaging the reversing gear the active straight steering intervention called first parking phase P1 is carried out by the parking assistant. For the first straight section P1 the speed during parking is limited to 10 km/h as, if applicable, an active braking intervention is caused on the part of the assistance system. Therefore, if the driver exceeds the speed of 10 km/h, then an active slowing down is carried out by the park steering assistant. The slowing down thereby may be carried out by means of a slowing down in a jerky manner or a comfortable controlled slowing down to 10 km/h. A deactivation of the assistance function "assisted parking" thus is positively avoided.

During the second parking phase P2 the active steering intervention is carried out by turning as depicted graphically by the first curve. The speed is limited to 7 km/h in this section P2 in order to minimize the deviation from the planned reference curve, i.e. from the parking trajectory. If the driver exceeds the speed of 7 km/h then an active slowing down is carried out by the park steering assistant, wherein the slowing down again may be carried out by means of a jerky slowing down or by means of a comfortable controlled slowing down to the maximum speed of 7 km/h. Also here the function of assisted parking is not deactivated.

In the last phase P3 depicted here the vehicle is brought to a standstill towards the end of the parking space by the driver.

The depiction of the single step parking of FIG. 1 in an analogous manner of course is also applicable to multiple step parking, as is necessarily the case with smaller parking spaces. In the case of multiple step parking it is of course feasible to predetermine different maximum speeds for straight and turning parking phases directed forward and backward, however, in a first embodiment a speed limit of 7 km/h is preset for turning parking phases independent of the direction, while a speed limit of 10 km/h is reasonable for straight parking phases.

Figure 2:
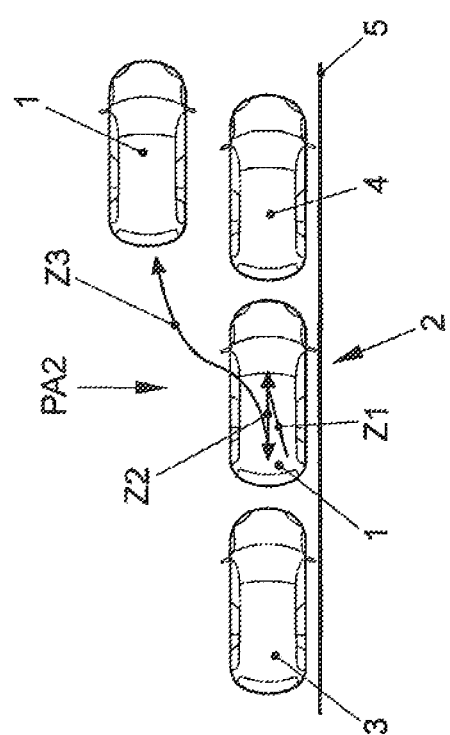
FIG. 2 shows a multiple step pulling out from a longitudinal parking space.

FIG. 2 shows the speed limit during assisted pulling out of a vehicle 1 from a parking space 2 which is formed by the parked vehicles 3 and 4 plus the curb 5. As indicated in FIG. 2, the parking space is relatively short, so that the pulling out activity depicted by pulling out action PA2 consists of several steps Z1, Z2 and Z3. At the same time these steps Z1, Z2 or Z3 may consist of different active straight or active turning parking phases not shown.

Also here, the speed is actively limited to a predetermined maximum speed for each parking phase. If the driver exceeds the respective maximum speed, then an active slowing down is carried out by the park steering assistant, wherein also here the slowing down again may be carried out in a jerky manner or comfortably controlled. The function of the park steering assistant again is not deactivated by the active braking intervention during assisted pulling out, since the maximum speed cannot be exceeded.

Figure 3:
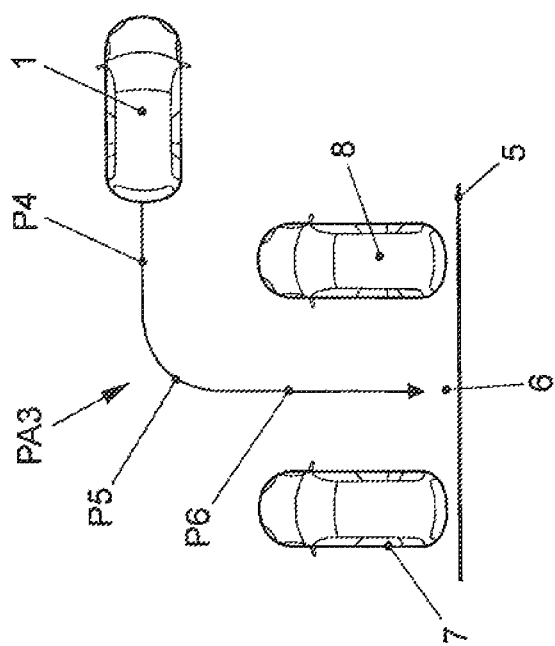
FIG. 3 shows a single step parking into a transverse parking space.

FIG. 3 finally shows the parking of a vehicle 1 into a transverse parking space 6, which is formed by transversely parked vehicles 7 and 8 and a curb 5. Also here, the parking activity PA3 is formed by a straight parking phase P4, a subsequent turning parking phase P5 and an active straight parking phase P6 with subsequent standstill. The speed of the vehicle 1 during the active straight parking phases P4 and P6 is limited to a maximum speed of 10 km/h and during the active turning phase P5 to a maximum speed of 7 km/h by active braking intervention. If the driver exceeds the limiting speed thresholds here, then again a jerky or comfortably controlled slowing down is carried out, which when indicated may be adjustable corresponding to the driver's desire.

REFERENCE NUMERALS 1 vehicle
2 longitudinal parking space
3 parked vehicle
4 parked vehicle
5 curb
6 transverse parking space
7 parked vehicle
8 parked vehicle
PA1 parking activity 1
P1 parking phase 1
P2 parking phase 2
P3 parking phase 3
PA2 parking activity 2
Z1 step 1
Z2 step 2
Z3 step 3
PA3 parking activity 3
P4 parking phase 4
P5 parking phase 5
P6 parking phase 6

What is claimed is:

1. A device for assisted parking of a motor vehicle in a parking space or assisted pulling out of a motor vehicle from a parking space, comprising
    a periphery sensor system for measuring current periphery data,
    a parking space determination unit for determining a parking space during a passing by,
    a trajectory unit for calculating a parking or pulling out trajectory,
    an assistance unit for assisting the driver during a parking or pulling out activity,
    a steering interface for controlling a controllable steering unit for conducting an active steering intervention,
    a comparison unit for comparing the current speed to predetermined maximum speeds of individual parking phases, and
    a limiting unit for carrying out an active slowing down of the motor vehicle on the basis of the comparison result of the comparison unit for limiting the speed of the motor vehicle;
    wherein the device is operable, for each parking phase of a single step or multiple step parking or pulling out activity consisting of several parking phases, to determine a maximum speed, and furthermore, when exceeding the predetermined speed during a parking phase, to limit the speed of the motor vehicle to the maximum speed allowed for the parking phase;
    wherein parking phases comprising active straight steering intervention are limited by a maximum speed of 10 km/h and parking phases comprising active turning steering intervention are limited by a maximum speed of 7 km/h.

2. A method for assisted parking of a motor vehicle in a parking space or assisted pulling out of a motor vehicle from a parking space, the method comprising:
    differentiating between several parking phases of a single step or multiple step parking activity or a pulling out activity as including active straight steering intervention or active turning steering intervention;
    predetermining a maximum speed for each parking phase;
    monitoring the actual speed during one of the several parking phases; and
    if exceeding the maximum speed during the one of the several parking phases, limiting with a limiting unit the speed of the motor vehicle to the maximum speed allowed for the parking phase;
    wherein parking phases comprising active straight steering intervention are limited by a maximum speed of 10 km/h and parking phases comprising active turning steering intervention are limited by a maximum speed of 7 km/h.

3. The method according to claim 2, wherein the limitation of the speed to the maximum speed allowed for the parking phase is carried out by actively slowing down the motor vehicle.

4. The method according to claim 2, wherein the active slowing down is carried out by at least one of means of the braking system of the motor vehicle and by means of throttling of the engine output.

5. The method according to claim 2, wherein in a multiple step parking or pulling out activity the parking phases are differentiated between parking phases comprising active straight steering intervention in forward or backward direction and in parking phases comprising active turning steering intervention in forward or backward direction.

6. The method according to claim 2, wherein the active slowing down is carried out in a jerky manner or comfortably controlled.

7. A device for assisted parking of a motor vehicle in a parking space or assisted pulling out of a motor vehicle from a parking space, comprising:
   a periphery sensor system for measuring current periphery data;
   a parking space determination unit for determining a parking space during a passing by;
   a trajectory unit for calculating a parking or pulling out trajectory;
   an assistance unit for assisting the driver during a parking or pulling out activity;
   a steering interface for controlling a controllable steering unit for conducting an active steering intervention;
   a comparison unit for comparing the current speed to predetermined maximum speeds of individual parking phases; and
   a limiting unit for carrying out an active slowing down of the motor vehicle on the basis of the comparison result of the comparison unit for limiting the speed of the motor vehicle;
   wherein the device is operable, for each parking phase of a single step or multiple step parking or pulling out activity consisting of several parking phases, to determine a maximum speed, and furthermore, when exceeding the predetermined speed during a parking phase, to limit the speed of the motor vehicle to the maximum speed allowed for the parking phase; and
   wherein parking phases comprising active straight steering intervention are limited by a maximum speed of 10 km/h and parking phases comprising active turning steering intervention are limited by a maximum speed of 7 km/h.

8. The device according to claim 7, wherein the limiting unit has at least one of: an interface for controlling a controllable brake unit and an interface for regulating the engine output for active slowing down of the motor vehicle.

9. The device according to claim 7, wherein the device has a display unit for informing the driver about the assisted parking or pulling out activity.

10. The device according to claim 7, wherein the limitation of the speed to the maximum speed allowed for the parking phase is carried out by actively slowing down the motor vehicle.

11. The device according to claim 7, wherein the active slowing down is carried out by at least one of means of the braking system of the motor vehicle and by means of throttling of the engine output.

12. The device according to claim 7, wherein in a single step parking or pulling out activity the parking phases are differentiated between parking phases comprising active straight steering intervention and parking phases comprising active turning steering intervention.

13. The device according to claim 7, wherein in a multiple step parking or pulling out activity the parking phases are differentiated between parking phases comprising active straight steering intervention in forward or backward direction and in parking phases comprising active turning steering intervention in forward or backward direction.

14. The device according to claim 7, wherein the active slowing down is carried out in a jerky manner or comfortably controlled.

\* \* \* \* \*